United States Patent
Marzorati

(10) Patent No.: US 8,355,712 B2
(45) Date of Patent: *Jan. 15, 2013

(54) METHOD FOR REMOTELY CONTROLLING A MOBILE TERMINAL

(75) Inventor: Stefano Marzorati, Milan (IT)

(73) Assignees: Vodafone Group PLC, Newbury (GB); Vodafone Omnitel N.V., Milan (IT)

( * ) Notice: Subject to any disclaimer, the term of this patent is extended or adjusted under 35 U.S.C. 154(b) by 411 days.

This patent is subject to a terminal disclaimer.

(21) Appl. No.: 12/520,570

(22) PCT Filed: Dec. 14, 2007

(86) PCT No.: PCT/IB2007/003912
§ 371 (c)(1),
(2), (4) Date: Jun. 22, 2009

(87) PCT Pub. No.: WO2008/081240
PCT Pub. Date: Jul. 10, 2008

(65) Prior Publication Data
US 2010/0020750 A1  Jan. 28, 2010

(30) Foreign Application Priority Data
Dec. 22, 2006 (IT) .............................. MI2006A2499

(51) Int. Cl.
*H04W 4/00* (2009.01)

(52) U.S. Cl. .................................. 455/420; 455/419
(58) Field of Classification Search ................ 455/3.03, 455/68–72, 88, 92, 352–355, 418–420, 566
See application file for complete search history.

(56) References Cited

U.S. PATENT DOCUMENTS

| 7,277,726 B2 | 10/2007 | Ahya et al. | |
| 2005/0104717 A1* | 5/2005 | Kaplan | 340/5.74 |
| 2006/0172729 A1* | 8/2006 | Kirbas | 455/418 |
| 2006/0246915 A1* | 11/2006 | Shrivastava | 455/445 |

* cited by examiner

Primary Examiner — Ajit Patel
Assistant Examiner — Erica Navar
(74) Attorney, Agent, or Firm — B. Aaron Schulman, Esq.; Stites & Harbison, PLLC

(57) ABSTRACT

The invention relates to a method for controlling remotely a mobile terminal (30). The method envisages providing a command (COM) to be sent from a remote server (2) to the mobile terminal (30), and a voice signal (V) to be transmitted from a remote server (20) to the mobile terminal (30). The voice signal (V) is encoded in a voice data packet flow (VOICE_FLOW) and the command (COM) in command data packets (COMk) so as to generate a packet data flow (DATA_FLOW) comprising the voice data packet flow (VOICE_FLOW) and the command data packets (COMk). This packet data flow (DATA_FLOW) is thus sent from the remote server (20) to the mobile terminal (30).

13 Claims, 2 Drawing Sheets

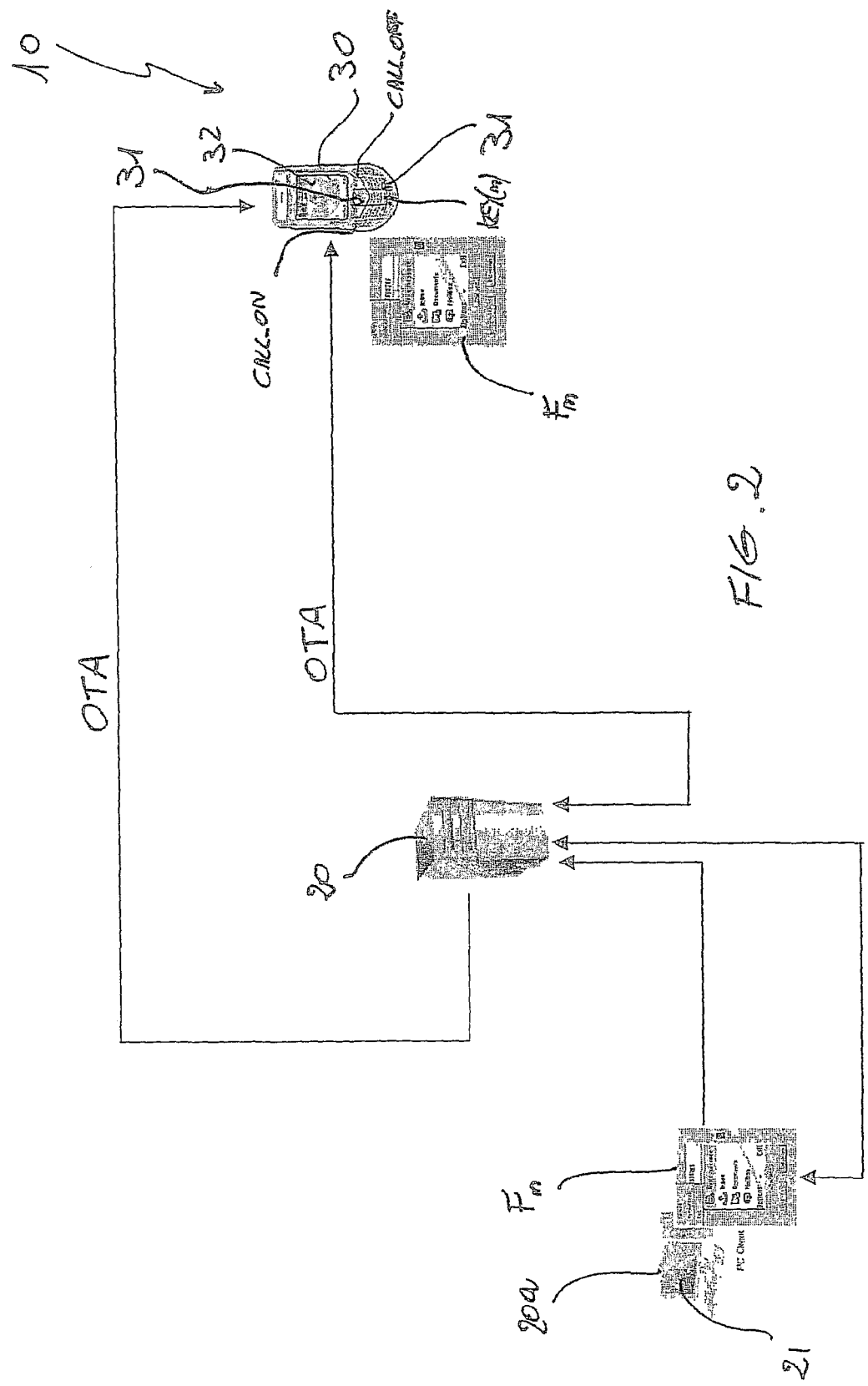

METHOD FOR REMOTELY CONTROLLING A MOBILE TERMINAL

Figure 1:
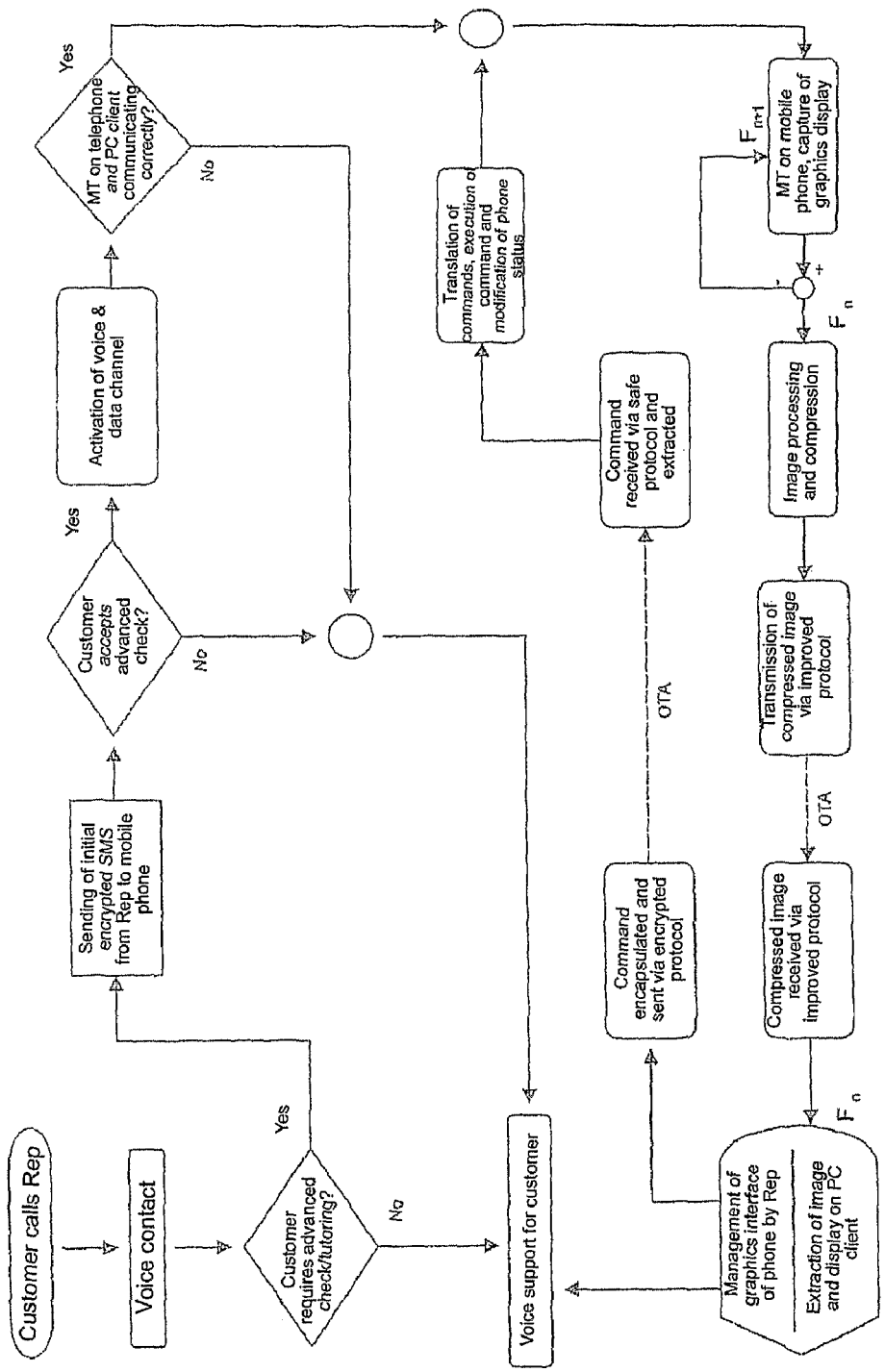

The present invention relates to a method for controlling remotely a mobile terminal.

According to the state of the art, methods are known for controlling remotely mobile terminals whereby a remote server sends one or more commands to a mobile terminal. The command is sent from the remote server to the mobile terminal via an OTA channel, for example by means of one or more SMS messages. The mobile terminal or the SIM card of the mobile terminal is provided with an application which is able to intercept the message received and execute the command.

This remote control method is used for example in connection with customer assistance where an operator at a call centre sends commands to the mobile terminal of a user who has requested assistance in order to solve a particular problem with his/her mobile terminal.

The control method described above, although it allows the mobile terminal to execute a series of commands sent remotely, does not allow the operator at the call centre to converse with the user of the mobile terminal at the same time as the sending of the command. A telecommunications system of the GSM OR GPRS type, in fact, does not allow the operator to establish with the user simultaneously a data connection and a voice connection. This prevents, for example, the operator at the call centre from being able to guide and instruct the user when navigating through the various menus on the mobile terminal, thereby providing a kind of long-distance training service. This drawback is also present in telecommunications systems other than the GSM system, for example GPRS and UMTS systems, should the mobile terminal no longer be situated within the coverage of the GPRS or UMTS network and be registered in a network where there is only GSM coverage.

From the above, it comes out that there is a need to be able to control remotely a mobile terminal via remote control means so as to establish a simultaneous data and voice connection between the remote control means and the mobile terminal.

In view of the state of the art described, the object of the present invention is to provide a method for controlling remotely a mobile terminal via remote control means able to overcome the drawbacks present in the known art.

In accordance with the present invention, this object is achieved by a method for controlling remotely a mobile terminal via remote control means in accordance with Claim 1.

By means of the present invention it is possible to obtain a method for controlling remotely a mobile terminal via remote control means, which allows the operator present remotely at a remote server to send commands to the remote terminal and at the same time give voice instructions to the user of the mobile terminal so as to provide a kind of long-distance training or tutoring service.

Further characteristic features and advantages of the method according to the present invention will emerge from the description below of a preferred example of embodiment, provided by way of a non-limiting example, with reference to the accompanying figures, in which:

FIGS. 1 and 2 show basic diagrams illustrating the method for controlling remotely a mobile terminal via remote control means in accordance with the present invention.

With reference to the accompanying figures, a method for controlling remotely a mobile terminal 30 by means of remote control means 20 is described.

The mobile terminal 30 is registered in a telecommunications system, denoted overall by 10.

Advantageously, the control method according to the present invention can be used for the remote control of a mobile terminal 30 registered in a telecommunications system 10 where a single communications channel is present between the mobile terminal 30 and the remote control means 20, for example in a GSM telecommunications system.

In accordance with the embodiment shown in the accompanying figures and as described below, the mobile terminal 30 is controlled remotely by means of a remote server 20. Alternatively, the remote control means may comprise several remote servers or electronic processors or computers which are connected together in order to execute one or more of the steps of the method according to the present invention.

The control method according to the present invention comprises the following steps:

providing a command COM to be sent from the remote server 20 to the mobile terminal 30, providing a voice signal V to be transmitted from the remote server 20 to the mobile terminal 30, encoding the voice signal V in a voice data packet flow VOICE_FLOW, for example a Voice Over IP flow commonly called VOIP, and encoding the command COM in one or more command data packets $COM_k$, where k indicates the number of command data packets $COM_k$ with which the command COM is encoded, generating a packet data flow DATA_FLOW comprising the voice data packet flow VOICE_FLOW and the command data packets $COM_k$, and sending the packet data flow DATA_FLOW from the remote server 20 to the mobile terminal 30.

Since the packet data flow DATA_FLOW comprises both the command data packets $COM_k$ and the voice data packets of the packet flow VOICE_FLOW, it is possible to convey from the remote server 20 to the mobile terminal 30 both the command data and the voice data. In this way, should it be required to provide assistance to the client using the mobile terminal 30, it is possible to send not only commands to be executed on the mobile terminal 30 but also establish voice communication between the user and an operator communicating from the remote server 20, for example an operator at a customer service centre or call centre.

Essentially, with the control method according to the present invention it is possible to have access simultaneously to a voice channel for sending instructions/voice commands and a data channel for sending commands to the mobile terminal 30 when there is only one communications channel between the mobile terminal 30 and the remote server 20, i.e. in all those cases where two physically separate channels are not present.

It should be pointed out that the term "voice signal V" comprises any type of voice signal, whether it be an analog signal or a signal already converted into a digital signal. For example, the voice signal V may be generated by a user by means of a normal microphone or may be generated and then stored in digital format so that it can be subsequently retrieved when required.

The step of generating the packet data flow DATA_FLOW comprises the step of multiplexing the voice data packet flow VOICE_FLOW with the command data packets $COM_k$.

In accordance with a preferred embodiment, the multiplexing step comprises the step of inserting the command data packets $COM_k$ in a position adjacent to the voice data packets which form the voice data packet flow VOICE_FLOW.

Each packet comprises one or more headers H intended to identify the contents of the payload P. The voice data is contained in the payload P, in the example a payload of the RTP type, while the data relating to the content of the payload P, for example the type of source, the size, the VOIP encoding type, are contained in the header H, in the example the header H of the RTP type.

The packet may also comprise headers of the UDP and IP type for transmission with the UDP protocol within a network using an IP protocol.

In accordance with a preferred embodiment, the packet starts with a fixed header H comprising:
- a payload type identifier: in the example a specific payload for the commands is identified;
- a command identifier: in the example this consists of sixteen bits and has a progressively increasing value so as to maintain the sequence of commands sent in the case of several commands; in this way it is possible to maintain the correct sequence in the case of several commands sent to the mobile terminal 20.

Typically, the mobile terminal 30 comprises a plurality of control devices KEY(n),CALL_ON,CALL_OFF. Advantageously, the command COM represents activation of one of the control devices.

In particular, the mobile terminal 30 typically comprises a user interface 31 with a plurality of control devices KEY(n), CALL_ON,CALL_OFF and a graphics interface 32. Each control device KEY(n),CALL_ON,CALL_OFF is associated with a command COM representing activation of the respective control device. The remote server 20 also comprises a graphics interface 21.

The control devices typically comprise the numerical keys $KEY_n$, with n=0 . . . 9, the call send/call reply key CALL_ON and the call reject/call end key CALL_OFF. Some mobile terminals are also equipped with a joystick device.

In this case, the step of providing a command COM comprises the following steps:
- displaying on the graphics interface 21 of the remote server 20 the user interface 31 of the mobile terminal 30,
- activating, on the graphics interface 21 of the remote server, one of the control devices KEY(n),CALL_ON, CALL_OFF of the user interface 31 so as to generate the command COM associated with activation of the activated control device KEY(n),CALL_ON,CALL_OFF.

The command COM associated with each numerical key $KEY_n$ will therefore be the event associated with pressing of the numerical key, and likewise the command COM associated with the call send/call reply key CALL_ON and the call reject/call end key CALL_OFF will be the event associated with pressing of the associated key.

In the case of a mobile terminal equipped with a joystick, it is possible to envisage displaying on the graphics display 21 of the remote server 20 a plurality of movements associated with the joystick, for example up, down, right, left, pressing the joystick and the four diagonal movements.

As a result it is possible to generate one or more commands which allow complete navigation of the menu on the mobile terminal 30 so as to perform any operation.

The mobile terminal 30 receives from the remote server the packet data flow DATA_FLOW and retrieves the command COM from the packet data flow DATA_FLOW. The retrieved command COM is executed in the mobile terminal 30.

In particular, the step of retrieving the command COM comprises the step of decoding the packet data flow DATA_FLOW received in order to extract the command COM.

In the case in question, in sequence the mobile terminal 30 extracts from the packet data flow DATA_FLOW the part relating to the commands, namely the command data packets $COM_k$ or the corresponding codes and then performs decoding of the voice data packet flow VOICE_FLOW. If there is more than one command, the mobile terminal 30 isolates the various commands $COM_k$ and, owing to the command counter contained in the packet, generates in sequence the events associated with the specific command COM in the same order in which they were generated.

Execution of the command COM causes variations of the image $F_n$ displayed on the graphics interface 32 of the mobile terminal 30. In order to allow verification of execution of the command COM on the mobile terminal 30, the method comprises the step of displaying on the graphics interface 21 of the remote server 20 the image $F_n$ displayed on the graphics interface 32 of the mobile terminal 30 following the execution of the command COM in the mobile terminal 30.

Advantageously, prior to the step involving display on the graphics interface 21 of the remove server 20, the method envisages the steps of:
- sending, from the mobile terminal 30 to the remote server 20, data representing the image $F_n$ displayed on the graphics interface 32 of the mobile terminal 30, and
- receiving in the remote server 20 the data representing the image $F_n$ displayed in the graphics interface 32 of the mobile terminal 30. After execution of the command COM, the image $F_n$ may change into an image $F_{n+1}$ different from the image $F_n$. In this case the image $F_{n+1}$ will be sent.

Advantageously, it is possible to avoid sending the data representing each image $F_n$, but it is sufficient to execute a logic operation for the difference between two successive images, for example $F_n$ and $F_{n+1}$, and send only data representing the changed image portion or the difference $F_{n+1}-F_n$.

Essentially, the method may envisage, prior to the display step, the following steps:
- sending, from the mobile terminal 30 to the remote server 20, data representing variations $F_{n+1}-F_n$ of the image displayed on the graphics interface 32 of the mobile terminal 30,
- receiving in the remote server 20 this data representing the variations $F_{n+1}-F_n$ of the image displayed on the graphics interface 32 of the mobile terminal 30,
- processing the data representing the variations $F_{n+1}-F_n$ of the image displayed on the graphics interface 32 of the mobile terminal 30 with data representing the image $F_n$ displayed on the graphics interface 32 of the mobile terminal 30 prior to execution of the command COM for displaying on the graphics interface 21 of the remote server 20 the image $F_{n+1}$ displayed on the graphics interface 32 of the mobile terminal 30 following execution of the command COM in the mobile terminal 30.

In particular, the data representing the image $F_n$ displayed on the graphics interface 32 of the mobile terminal 30 prior to execution of the command COM is obtained by means of the following steps:
- sending, from the mobile terminal 30, to the remote server 20, data representing the image $F_n$ displayed on the graphics interface 3 of the mobile terminal 30, prior to execution of the command COM, and
- receiving in the remote server 20 this data representing the image $F_n$ displayed on the graphics interface 32 of the mobile terminal 30, prior to execution of the command COM.

Below an example of application of the method for controlling remotely a mobile terminal according to the invention is described. In particular, the example described below refers to the case where the method is used with the function of providing tutoring or assistance to a user possessing the mobile terminal 30.

In the example shown in FIG. 1, the user with the mobile terminal 30 contacts, by means of a voice call, an operator at the call centre (REP) and asks for an advanced check to be performed by the operator. At this point, the operator sends an Over The Air (OTA) message, in the example an encrypted SMS message, from the remote server 20 to the mobile terminal 30. If the user replies affirmatively to the message sent, the operator at the call centre performs an operation in order to activate the data and voice channel from the remote server 20 to the mobile terminal 30.

Standard checks are then carried out in order to establish whether the software resident on the mobile terminal 30, called Mobile Tutoring or MT, and the software resident in the remote server 20, called PC client, communicate correctly.

At this point, the operator at the call centre is able to communicate by voice with the user of the mobile terminal 30 and at the same time send commands COM to the mobile terminal 30. In particular, the command COM is generated by the computer 20a of the operator at the call centre and is encapsulated and sent from the remote server 20 to the mobile terminal 30 as described above, for example using an encrypted protocol, within the packet data flow DATA_FLOW.

The command COM is then extracted from the packet data flow DATA_FLOW and executed on the mobile terminal 30. For this purpose, the mobile terminal 30 has a command interpreter which translates the command COM into the language of the software operating system installed in the mobile terminal so as to allow execution of the retrieved command COM.

Advantageously, moreover, the operator at the call centre may display on the graphics interface 21 of the remote server 20 the variations of the images which occur on the graphics interface 32 of the mobile terminal 30 following the sending of each command COM.

In a manner known per se, the mobile terminal 30 may be provided with an application which allows processing of the images displayed on the graphics interface 32 of the said terminal 30 and compression of these images before sending them to the remote server 20.

As can be understood from the description above, with the method according to the present invention it is possible to satisfy the requirements and overcome the drawbacks referred to in the introductory part of the present description with reference to the known art.

In particular, with the method according to the invention, an operator present remotely at the remote server is able to send commands to the mobile terminal and at the same time give voice instructions to the user of the mobile terminal so as to provide a kind of long-distance training service.

The method according to the present invention can be used in particular in all those cases where there is only one communications channel between the mobile terminal 30 and the remote server 20, for example in GSM telecommunications systems and in UMTS and GPRS systems should there be no GPRS or UMTS coverage.

Obviously, a person skilled in the art, in order to satisfy unforeseen and specific requirements, may make numerous modifications and variations to the method according to the invention described above, all of which moreover are contained within the scope of protection of the invention as defined by the following claims.

The invention claimed is:

1. A method for controlling remotely a mobile terminal via remote control means, said method comprising the steps of:
providing a command (COM) to be sent from said remote control means to said mobile terminal and executed on said mobile terminal,
providing a voice signal (V) to be transmitted from said remote control means to said mobile terminal,
encoding said voice signal (V) in a voice data packet flow (VOICE_FLOW) and said command (COM) in command data packets (COMk),
generating a packet data flow (DATA_FLOW) comprising said voice data packet flow (VOICE_FLOW) and said command data packets (COMk) by multiplexing said voice data packet flow (VOICE_FLOW) with said command data packets (COMk) such that said command data packets (COMk) are inserted in said voice data packet flow (VOICE_FLOW) to generate said packet data flow (DATA_FLOW), and
sending said packet data flow (DATA_FLOW) from said remote control means to said mobile terminal, in which said mobile terminal comprises a user interface with a plurality of control devices (KEYn,CALL_ON,CALL_OFF) and a graphics interface, each control device (KEYmCALL_ON,CALL_OFF) being associated with a command (COM) representing activation of the respective control device, said remote control means comprises a graphics interface, and said step of providing said command (COM) comprises the steps of:
displaying, on the graphics interface of said remote control means, the user interface of said mobile terminal, and
activating, on the graphics interface of said remote control means, a control device (KEYn,CALL_ON,CALL_OFF) of the user interface so as to generate the command (COM) representing activation of the activated control device (KEYn,CALL_ON,CALL_OFF).

2. The method according to claim 1, in which said voice data packet flow (VOICE_FLOW) comprises voice data packets, said multiplexing step comprising the step of inserting said command data packets ($COM_k$) in a position adjacent to said voice data packets.

3. The method according to claim 1, in which said mobile terminal comprises a plurality of control devices ($KEY_n$, CALL_ON,CALL_OFF), said command (COM) representing activation of a control device from among said plurality of control devices ($KEY_n$,CALL_ON,CALL_OFF).

4. The method according to claim 1, comprising the steps of:
receiving said packet data flow (DATA_FLOW) from said remote control means in said mobile terminal,
retrieving said command (COM) from said packet data flow (DATA_FLOW),
executing said retrieved command (COM) in said mobile terminal.

5. The method according to claim 4, in which said step for retrieving said command (COM) comprises the step of decoding said packet data flow (DATA_FLOW) received in order to extract said command (COM).

6. The method according to claim 4, in which execution of said command (COM) causes variations of the image ($F_n$) displayed on the graphics interface of the mobile terminal, said method comprising the step of displaying on the graphics interface of said remote control means the image ($F_n$) displayed on the graphics interface of the mobile terminal following execution of said command (COM) in said mobile terminal.

7. The method according to claim 6, comprising, prior to the display step, the steps of:
sending, from the mobile terminal to the remote control means, data representing the image ($F_n$) displayed on the graphics interface of the mobile terminal, receiving in said remote control means said data representing the image ($F_n$) displayed on the graphics interface of the mobile terminal.

8. The method according to claim 6, comprising, prior to the display step, the steps of:

sending, from the mobile terminal to said remote control means, data representing the variations ($F_{n+1}-F_n$) of the image displayed on the graphics interface of the mobile terminal, receiving in said remote control means said data representing the variations ($F_{n+1}-F_n$) of the image displayed on the graphics interface of the mobile terminal, processing said data representing the variations ($F_{n+1}-F_n$) of the image displayed on the graphics interface of the mobile terminal with data representing the image (Ft) displayed on the graphics interface of the mobile terminal prior to execution of said command (COM) so as to display on the graphics interface of said remote control means the image ($F_{n+1}$) displayed on the graphics interface of the mobile terminal following execution of said command (COM) in said mobile terminal.

9. The method according to claim 8, in which the data representing the image ($F_n$) displayed on the graphics interface of the mobile terminal prior to the execution of said command (COM) is obtained by means of the steps of:

sending, from the mobile terminal to said remote control means, data representing the image ($F_n$) displayed on the graphics interface of the mobile terminal, receiving in said remote control means said data representing the image ($F_n$) displayed on the graphics interface of the mobile terminal.

10. The method according to claim 1, in which said remote control means comprise a remote server.

11. The method according to claim 1, in which said mobile terminal is registered in a telecommunications system equipped with a single channel for communication between said mobile terminal and said remote control means.

12. The method according to claim 11, in which said telecommunications system is a GSM telecommunications system.

13. A data processing product which can be directly loaded in the memory of a numerical processor device, comprising portions of a program code able to implement the method according to claim 1 when run on said processor device.

* * * * *